United States Patent
Sugimura et al.

(10) Patent No.: US 7,599,606 B2
(45) Date of Patent: *Oct. 6, 2009

(54) RECORDING MEDIUM AND METHOD FOR REPRODUCING INFORMATION THEREFROM

(75) Inventors: Naozumi Sugimura, Yokohama (JP); Hiroo Okamoto, Yokohama (JP); Junji Shiokawa, Chigasaki (JP)

(73) Assignee: Hitachi, Ltd., Tokyo (JP)

( * ) Notice: Subject to any disclaimer, the term of this patent is extended or adjusted under 35 U.S.C. 154(b) by 140 days.

This patent is subject to a terminal disclaimer.

(21) Appl. No.: 11/932,040

(22) Filed: Oct. 31, 2007

(65) Prior Publication Data

US 2008/0069527 A1    Mar. 20, 2008

Related U.S. Application Data

(63) Continuation of application No. 11/250,505, filed on Oct. 17, 2005, now Pat. No. 7,483,622, which is a continuation of application No. 10/664,901, filed on Sep. 22, 2003, now Pat. No. 7,496,280.

(30) Foreign Application Priority Data

Jun. 13, 2003   (JP) .............................. 2003-168591

(51) Int. Cl.
*H04N 5/91* (2006.01)

(52) U.S. Cl. .............................. 386/95; 386/65; 386/46; 386/124; 386/125; 386/126; 386/12; 386/96; 386/98; 386/39; 386/69

(58) Field of Classification Search .................... 386/95, 386/69, 46, 124–126, 12
See application file for complete search history.

(56) References Cited

U.S. PATENT DOCUMENTS

| | | | |
|---|---|---|---|
| 5,552,833 A * | 9/1996 | Henmi et al. | 348/460 |
| 5,659,400 A * | 8/1997 | Edakubo et al. | 386/46 |
| 6,023,552 A | 2/2000 | Kunihiro | |
| 6,212,330 B1 * | 4/2001 | Yamamoto et al. | 386/95 |
| 6,574,419 B1 | 6/2003 | Nonomura et al. | |

(Continued)

FOREIGN PATENT DOCUMENTS

CN    1383678 A    12/2002

(Continued)

OTHER PUBLICATIONS

Chinese Office Action dated Nov. 3, 2006.
Chinese Office Action dated Sep. 14, 2007.

*Primary Examiner*—Thai Tran
*Assistant Examiner*—Helen Shibru
(74) *Attorney, Agent, or Firm*—Antonelli, Terry, Stout & Kraus, LLP.

(57) ABSTRACT

A recording medium having recorded thereon, a plurality of picture information sets, presentation time values each of which is associated with the corresponding one of the picture information sets, picture information record marks each of which is associated with the corresponding one of said presentation time values, clip information specifying what position on the recording medium is associated with each of said presentation time values, and reproducing order specifying information specifying in what order the picture information sets are to be reproduced.

2 Claims, 11 Drawing Sheets

U.S. PATENT DOCUMENTS

| | | |
|---|---|---|
| 6,594,442 B1 | 7/2003 | Kageyama |
| 6,763,180 B2 | 7/2004 | Ando et al. |
| 6,771,890 B1 | 8/2004 | Moon |
| 6,798,839 B2 * | 9/2004 | Iwata et al. ............ 375/240.28 |
| 6,798,976 B2 | 9/2004 | Tsumagari |
| 6,961,384 B2 * | 11/2005 | Nemiroff et al. ....... 375/240.26 |
| 6,975,363 B1 | 12/2005 | Baldwin et al. |
| 7,327,938 B2 * | 2/2008 | Ando et al. .................... 386/95 |
| 2001/0031131 A1 | 10/2001 | Fukai et al. |
| 2002/0135608 A1 * | 9/2002 | Hamada et al. ............. 345/723 |
| 2004/0184780 A1 * | 9/2004 | Seo et al. ....................... 386/95 |
| 2005/0019007 A1 | 1/2005 | Kato et al. |
| 2007/0286577 A1 | 12/2007 | Kato et al. |

FOREIGN PATENT DOCUMENTS

| | | |
|---|---|---|
| JP | 2000-217066 | 8/2000 |
| JP | 2001-189907 | 7/2001 |
| JP | 2002-056651 | 5/2002 |
| JP | 2002-158971 | 5/2002 |
| JP | 2002-158972 | 5/2002 |
| JP | 2003-045154 | 2/2003 |
| JP | 2003-045156 | 2/2003 |
| JP | 2003-123389 | 4/2003 |

* cited by examiner

FIG. 3 (PRIOR ART)

| Syntax | No. of bits | Mnemonic |
|---|---|---|
| xxxxx.rpls/yyyyy.vpls { | | |
|     version_number | 8*4 | bslbf |
|     PlayList_start_address | 32 | uimsbf |
|     PlayListMark_start_address | 32 | uimsbf |
|     MakersPrivateData_start_address | 32 | uimsbf |
|     reserved_for_future_use | 180 | bslbf |
|     UIAppInfoPlayList() | | |
|     for(i=0;i<N1;i++) { | | |
|         padding_word | 16 | bsfbf |
|     } | | |
|     PlayList() | | |
|     for(i=0;i<N2;i++) { | | |
|         padding_word | 16 | bslbf |
|     } | | |
|     PlayListMark() | | |
|     for(i=0;i<N3;i++) { | | |
|         padding_word | 16 | bslbf |
|     } | | |
|     MakersPrivateData() | | |
|     for(i=0;i<N4;i++) { | | |
|         padding_word | 16 | bslbf |
|     } | | |

FIG. 4

| Syntax | No.of bits | Mnemonic |
|---|---|---|
| PlayList() { | | |
|     length | 32 | uimsbf |
|     reserved_for_word_allign | 14 | bslbf |
|     type_of_presentation | 2 | uimsbf |
|     number_of_PlayItems | 16 | uimsbf |
|     number_of_SubPlayItems | 16 | uimsbf |
|     for( PlayItem_id=0;<br>         PlayItem_id<number_of_PlayItems;<br>         PlayItem_id++) { | | |
|         PlayItem() | | |
|     } | | |
|     for( i=0;<br>         i<number_of_SubPlayItems;<br>         i++) { | | |
|         SubPlayItem() | | |
|     } | | |
| } | | |

FIG. 5

| type_of_presentation | MEANING |
|---|---|
| 0 | REGULAR PLAY (AS MOVING/STILL PICTURE) |
| 1 | PLAY AS STILL PICTURE WITH BGM |

FIG. 6

| Syntax | No.of bits | Mnemonic |
|---|---|---|
| PlayItem() { | | |
| length | 32 | uimsbf |
| still_flag | 1 | bslbf |
| still_duration | 8 | bslbf |
| reserved_for_word_allign | 7 | bslbf |
| Clip_Information_file_name | 8*10 | bslbf |
| ref_to_STC_id | 8 | uimsbf |
| IN_time | 16 | uimsbf |
| OUT_time | 16 | uimsbf |
| } | | |

FIG. 7  (PRIOR ART)

| Syntax | No.of bits | Mnemonic |
|---|---|---|
| PlayListMark() { | | |
| length | 32 | uimsbf |
| number_of_PlayList_marks | 8*10 | uimsbf |
| for(i=0;i<number_of_PlayList_marks;i++) { | | |
| mark_type | 8 | uimsbf |
| mark_name_length | 8 | uimsbf |
| ref_to_PlayItem_id | 16 | uimsbf |
| mark_time_stamp | 32 | uimsbf |
| Entry_ES_PID | 16 | uimsbf |
| ref_to_thumbnail_index | 16 | uimsbf |
| mark_name | 8*32 | bslbf |
| } | | |
| } | | |

RECORDING MEDIUM AND METHOD FOR REPRODUCING INFORMATION THEREFROM

CROSS REFERENCE TO RELATED APPLICATIONS

This application is a Continuation of U.S. application Ser. No. 11/250,505, filed Oct. 17, 2005 now U.S. Pat. No. 7,483,622, which is a continuation of U.S. application Ser. No. 10/664,901, filed Sep. 22, 2003 now U.S. Pat. No. 7,496,280, which claims priority from JP 2003-168591, filed Jun. 13, 2003, the contents of which are incorporated herein by reference.

BACKGROUND OF THE INVENTION

The present invention relates to a technique for recording/reproducing picture information, in particular still picture information, on/from a recording medium.

FIG. 2 shows an example of the conventional arrangement of information files that are stored on an optical disk, such as a DVD (Digital Versatile Disc), where moving picture information is recorded. In the information file structure shown in FIG. 2, a directory DVR is formed on the optical disk. Each information file is recorded under this directory.

In FIG. 2, the info.dvr file 201 is a file where information such as the number and filenames of play lists under the DVR directory is written. The menu.tidx file 202 is a file where information such as the sizes and information amounts of thumbnails to be used in menus is recorded. The menu.tdat file 203 is a file where thumbnail picture information to be used in menus is recorded. The mark.tidx file 204 is a file where information such as the sizes and information amounts of thumbnails associated with mark positions are recorded. The mark.tdat file 205 is a file where thumbnail picture information to be used at mark positions is recorded. Play list files 206 are files where marks and other information specifying in what order and what parts of picture information are to be reproduced are recorded. Clip information files 207 are files where information such as play start points in stream files and their packet positions is recorded. Stream files 208 are files where such packets as picture information and sound information are recorded.

With respect to the stream files 208, picture information is compressed according to the MPEG2 standard, which is one of the standard picture information compressing techniques, and the compressed information is converted into a stream file before being recorded. MPEG2 provides an excellent ability to compress a large amount of information not only to NTSC-format picture information, but also to HD (High Density) picture information, such as Hi-Vision. The amount of information in original picture information can be compressed to about one tenth or one fiftieth. For example, picture information in the NTSC format is compressed to about 6 Mbps, while HD picture information is compressed to about 20 Mbps. In both cases, MPEG2 can attain a sufficiently high picture quality. Picture information compression by MPEG2 is widely used in such applications as accumulation of picture information on DVDs and digital broadcasting.

With respect to the clip information files 207, in the same manner as described above, picture information is compressed according to the MPEG2 format before being recorded. The MPEG2 system compresses picture information based on correlations between adjacent pictures. More specifically, if there are portions which do not change between adjacent pictures, information relating to these portions is not transmitted again, and the last picture information received is used as it is for these portions. However, this imposes a drawback in that not all picture information elements can be reproduced by decoding such picture information, only the changed portions of which were encoded. After such an operation as fast forward or skip, play can be restarted only from those pictures in which all picture information elements were encoded.

Generally, when picture information compression is performed according to the MPEG2 standard, picture information is divided into groups, each comprising about fifteen pictures. Each of these groups is called a GOP (Group of Pictures). Play from the top of a GOP allows immediate reproduction of picture information.

In the clip information file 207, the packet position of the top of each GOP is recorded with the time (corresponding to the Presentation Time Stamp value) indicating when its picture information was encoded. This makes it possible to easily find a play start position when a search or skip operation is performed.

Clip information files 207 are associated with stream files on a one-to-one basis. If a clip information file designated 01000.c1pi is recorded in association with a stream file designated 01000.m2ts, these files can easily be recognized as being associated with each other.

With respect to the play list files 206, information recorded in each play list file lists parts of stream files which are to be played in the specified order. FIG. 3 more specifically shows the information structure of the play list files. In a play list file, the version_number entry indicates the version of the play list. The PlayList_start_address entry indicates where the play list information is recorded in the play list file. The PlayListMark_start_address entry indicates where the play list mark information is recorded. The MakersPrivateData_start_address entry indicates where the maker's private information is recorded. Note that each play list contains information about one or more play items, indicating what parts of stream files are to be played.

An example of, the play list mark information will be described in detail with reference to FIG. 7. The length entry indicates the information length of the play list mark information. The number_of_PlayListMarks entry indicates the number of play list marks. The mark_type entry indicates the type of the play list mark. The mark_name_length entry indicates the length of the play list mark's name. The ref_to_PlayItem_id entry indicates the number of the play item associated with the play list mark. The mark_time_stamp entry indicates the time when the play list mark was marked. The Entry_ES_PID entry indicates the packet ID of the ES (Elementary Stream) of the play item associated with the play list mark. The ref_to_thumbnail_index entry indicates the number of the thumbnail associated with the play list mark. The mark_name entry stores a character string representing the name of the play list mark.

An example of the stream management structure of moving picture information will be described with reference to FIG. 13. As shown in FIG. 13, a stream is composed of plural titles and a title is composed of plural chapters. Each chapter is composed of plural scenes. In many cases, each scene is constituted by moving picture information that has been recorded continuously until recording is stopped after having been started.

With reference to FIG. 7 and FIG. 13, the types of play list marks will be described. Each play list mark may have be any of one of several identifiable types; for example, a title mark indicates the top of a title, a chapter mark indicates the top of a chapter and a skip mark indicates the top of a scene.

With reference to FIG. 8, an example of how the play list information, play item information, clip information, stream files and play list mark information are mutually associated will be described. Each play list includes one or plural play items. In this example, two play items 802 and 803 are shown a part of play list 801. Each play item specifies what part of what stream file is to be played by designating the corresponding clip information's filename, STC_sequence number, start time and stop time. More specifically, the play item 802 is associated with an area 804 of a stream file.

Each play item may be associated with a different stream file. Reference numerals 806 and 807 respective indicate positions where play list marks are recorded. Actually, these play list marks are recorded in the play list information and are converted to packet positions in the actual stream file by using the clip information. (For example, see Japanese Patent Laid-Open No. 2003-123389.)

The above-mentioned technique assumes that moving picture information is recorded and reproduced using MPEG stream files. However, it is necessary to record/reproduce still picture information as well as moving picture information. In addition, unlike moving picture information, when still picture information is to be reproduced, it is desirable to allow each still picture to be accessed easily. When reproducing a plurality of still pictures from a recording medium, the user is required to perform operations for such purposes as to switch to the previous or next picture.

Since the recording/reproducing of still picture information is not taken into consideration in the conventional recording and reproducing apparatus, however, the apparatus can not operate properly in response to the above-mentioned operations by the user. In addition, a method for displaying still picture information while outputting sound information continuously as BGM (Background Music) has not been taken into consideration.

It is an object of the present invention to solve the above-mentioned problems, that is, to allow still picture information to be easily selected and reproduced and to provide a user-friendly reproducing technique.

SUMMARY OF THE INVENTION

To solve the aforementioned problems, the present invention provides a recording medium on which the following information is recorded: a plurality of picture information sets; presentation time values, each of which is associated with a corresponding one of the picture information sets; picture information record marks, each of which is associated with a corresponding one of the presentation time values; and reproducing order specifying information which specifies in what order the picture information sets are to be reproduced.

In addition, the present invention provides a technique for reproducing information from a recording medium on which the following items are recorded: a plurality of picture information sets; presentation time values, each of which is associated with a corresponding one of the picture information sets; picture information record marks, each of which is associated with a corresponding one of the presentation time values; clip information which specifies what position on the recording medium is associated with each of the presentation time values; and reproducing order specifying information which specifies in what order the picture information sets are to be reproduced. The picture information is reproduced through the following steps: detecting the presentation time value of a picture information set to be retrieved from the corresponding picture information record mark; using the clip information to detect the recording position on the recording medium which corresponds to the detected presentation time value; and reproducing picture information from the detected recording position.

BRIEF DESCRIPTION OF THE DRAWINGS

FIG. 3 is a diagram which shows an example of the data structure of a play list file;

FIG. 4 is a diagram which shows an example of the data structure of play list information;

FIG. 5 is a diagram illustrating the information provided by a type_of_presentation entry;

FIG. 6 is a diagram which shows an example of the data structure of play item information;

FIG. 7 is a diagram which shows an example of the data structure of play list mark information;

DETAILED DESCRIPTION OF THE PREFERRED EMBODIMENTS

The following description is direction to a first embodiment of the present invention.

Although it is assumed in the description of this first embodiment that a DVD is being used as a recording medium, the present invention can also be applied to the use of a CD (Compact Disc), MD (Mini Disc) and various other information recording media.

It is also assumed in the following description that intra frame compressed picture information (I pictures) is included in recorded MEPEG stream files (hereafter denoted simply as stream files) according to the MPEG2 standard. Needless to say, information can be encoded by another picture information compression method as well.

Similar to picture information, sound information is compressed in terms of quantity by using a sound information compression technique in this first embodiment. The employed sound information compression technique is selectable from a variety of compression systems, such as the MPEG1 audio system and the AAC system that is used in BS digital broadcasting. In addition, since the amount of sound information is smaller than that of picture information, it can be recorded by a linear PCM method without compression.

In addition, in this first embodiment, picture information and sound information, which are encoded as described above, are multiplexed into a stream file and recorded as a single file so as to facilitate transmission and accumulation. More specifically, each information unit is converted into a 188-byte packet, which is given a PID (Packet ID) to identify the packet. Giving a unique PID to each unit of information allows packets to be sorted easily when they are reproduced.

In a first embodiment, not only picture and sound information, but also subtitle information, graphic information, control command information and other information packets can also be multiplexed into a stream file. Further, such packets as PMT (Program Map Table) and PAT (Program Allocation Table) packets, which define how PIDs are associated with each other, and a PCR (Program Clock Reference) packet indicating time information are also multiplexed. A stream file where information is multiplexed in this way is recorded on an optical disk as a stream file.

A reproducing apparatus according to the present invention will be described with reference to FIG. 1.

Figure 1:
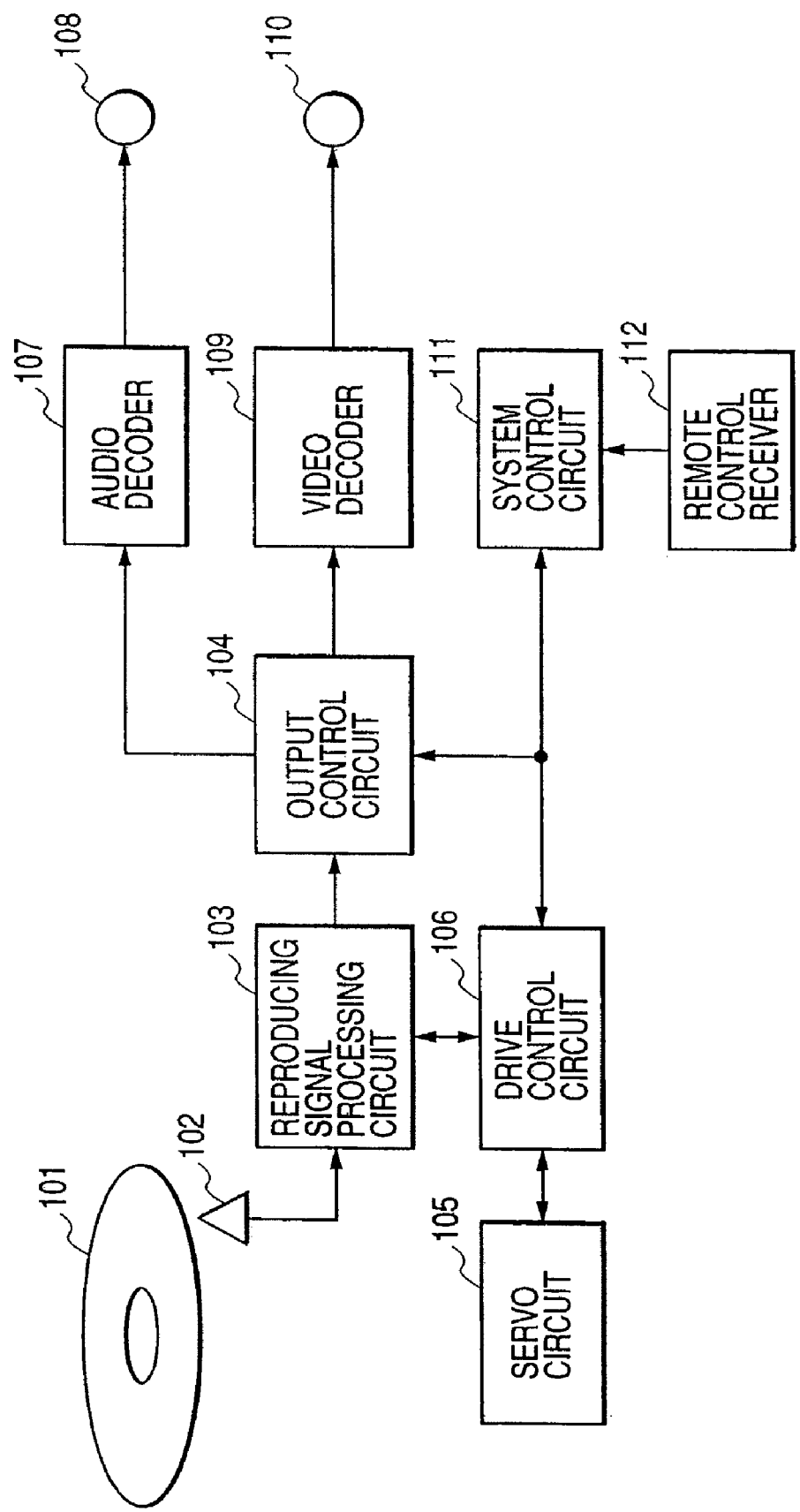
FIG. 1 is a block diagram of a reproducing apparatus with which the present invention is carried out.
Figure 2:
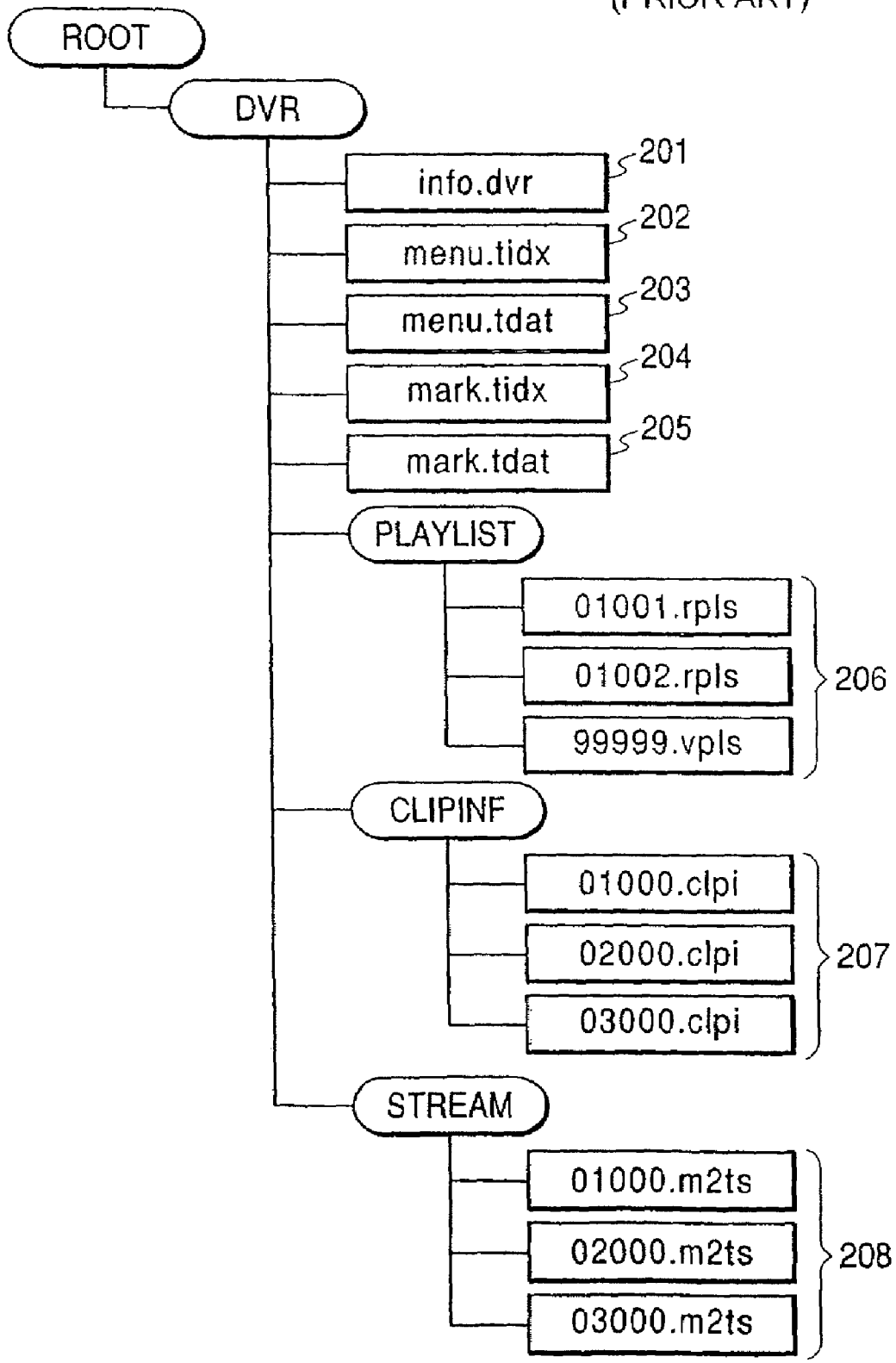
FIG. 2 is a diagram which shows an example of the structural arrangement of files on a recording medium.

In FIG. 1, an optical disk 101 has information recorded thereon, and an optical pickup 102 reads out information from the optical disk 101 by using laser light. In a reproducing signal processing circuit 103, the signal that has been read out through the optical pickup 102 is subjected to prescribed decoding processing, and it is converted to a digital signal. In an output control circuit 104, the digital signal from the reproducing signal processing circuit, where decoding processing was performed, is packetized according to a prescribed format, and it is then subjected to output processing. A servo circuit 105 controls the rotating speed of the optical disk and the position of the optical pickup 102. A drive control circuit 106 controls the servo circuit 105 and the signal processing circuit 103.

In an audio information decoder 107, a sound information signal is obtained by decoding sound information packets received from the output control circuit 104. An audio output terminal 108 outputs the sound information signal which was obtained through decoding by the audio information decoder 107. In a video information decoder 109, a picture information signal is obtained by decoding picture information packets received from the output control circuit 104. A video output terminal 110 outputs the picture information signal which was obtained through decoding by the video information decoder 109.

On the optical disk 101, stream files are recorded, in which picture information and sound information signal packets are multiplexed. In addition, such information as play list information, which lists items to be reproduced in the listed order from streams, clip information, which locates characteristic points in each stream, mark position information, which indicates skip positions and chapter start positions, and menu information, that is used to select a play list, are recorded as files in a prescribed format.

Each play list information file has information about one or plural play items, indicating what parts of what stream files are to be reproduced.

FIG. 4 shows an example of the data structure of the play item information in the first embodiment. In the play item information, the length entry indicates the length of the play items. The type_of_presentation entry indicates how the items are to be presented. The number_of_PlayItems entry indicates the number of play items in the play item information. The number_of_SubPlayItems entry indicates the number of sub play items (Sub play items will be described later in connection with a third embodiment.

FIG. 5 shows the meaning of the values which the type_of_presentation can have. More specifically, if type_of_presentation entry is 0, the play items are reproduced as ordinary moving or still picture information. If the type_of_presentation entry is 1, they are reproduced as still picture information with BGM. Note that still picture information with BGM will be described in detail later in connection with a third embodiment.

FIG. 6 shows an example of the data structure of the play item information. The length entry indicates the information length of the play item. The still_flag entry is a flag indicating whether the presentation is to be frozen at the end of the play item reproduced. If the still_flag entry is set, the still_duration entry specifies in seconds how long the presentation is to be frozen at the end of the play item being reproduced. When the entry still_duration=0, this specifies that the presentation is to be frozen infinitely. The Clip_Information_file_name entry represents the file identifier of the corresponding clip information file and stream file. The ref_to_STC_id entry indicates the sequence number of the STC in the stream file. The IN_time entry specifies where the play item begins in the stream file by designating the corresponding PTS in the picture information. The OUT_time entry specifies where the play item ends in the stream file by designating the corresponding PTS in the picture information.

Figure 8:
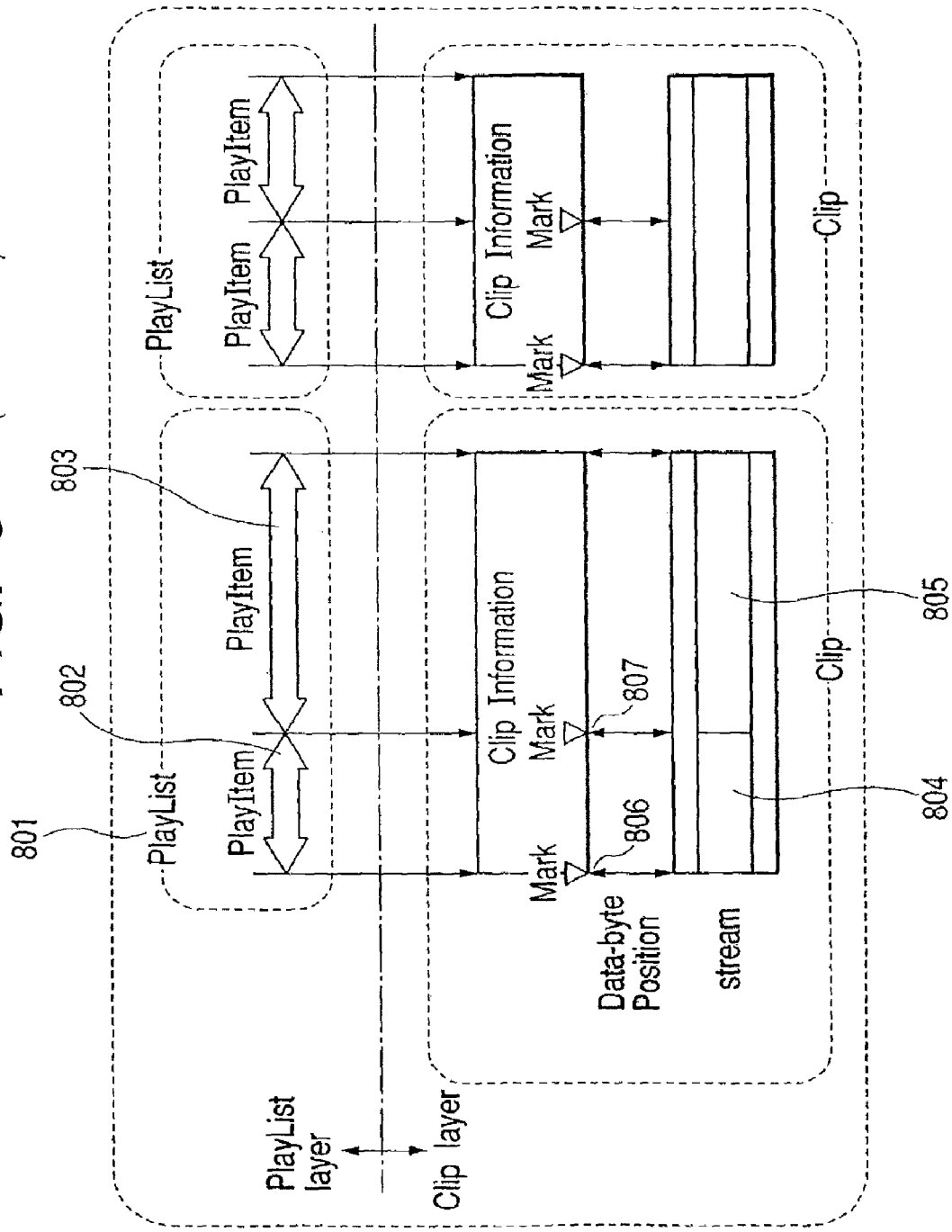
FIG. 8 is a diagram which shows how information is mutually associated when moving picture information is recorded.
Figure 14:
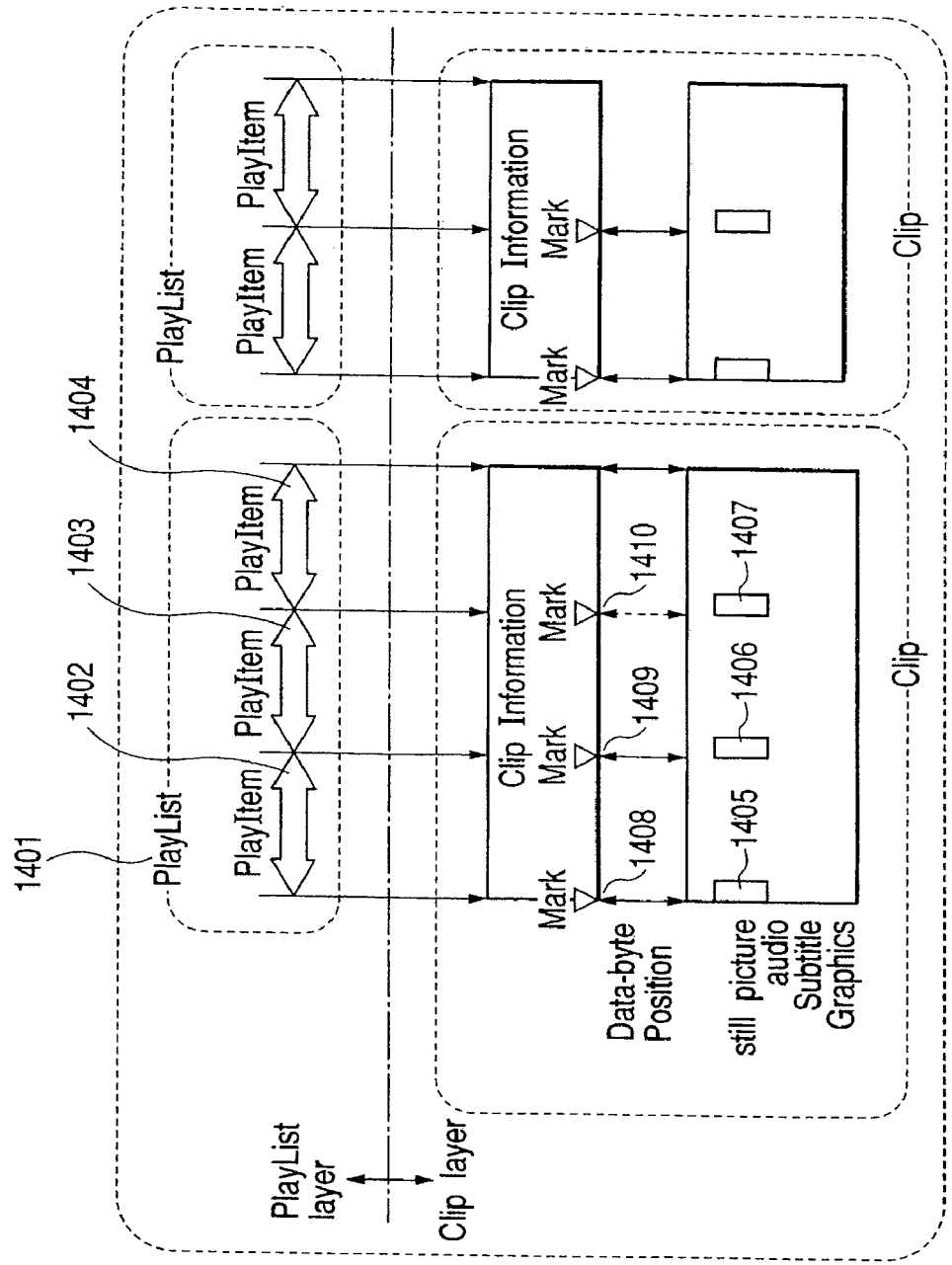
FIG. 14 is a diagram which shows how information is mutually associated when still picture information is recorded.

In the first embodiment, play items are respectively associated with individual still pictures, as shown in FIG. 14. On the other hand, as described with the conventional technique, in the case of moving picture information, it is not feasible to associate every I picture with a play item since this tremendously enlarges the size of the play list file. Thus, play list mark information is recorded at the top of each chapter, as shown in FIG. 8. By using such marks, it is possible to realize various functions, such as to start reproduction from the next chapter and to go back to the top of the current chapter and start reproduction therefrom. In the case of still picture information, however, it is desirable to associate each still picture with a play item. When switching to the previous or next still picture, this allows the still picture to be detected easily.

As described, in connection with the first embodiment, a plurality of still pictures can be recorded in such a manner that such operations as switching to the next or previous picture can be implemented easily.

Now, a second embodiment of the present invention will be described. Although the description thereof is based on some assumptions, these assumptions will not be specifically mentioned, since they are the same as those made in the description of the first embodiment.

The second embodiment is characterized in that each still picture is associated with a mark. That is, in the second embodiment, a still picture mark, which indicates the top of a still picture, is added as another type of play list mark to the syntax shown in FIG. 7. Accordingly, each play list mark is recognizable, for example, as either a chapter mark indicating the top of a chapter, a still picture mark indicating the top of a still picture or a skip mark indicating the skip position of a scene.

The meaning of each mark can be recognized if the mark is given prescribed numbers assigned to the type of mark. This allows plural marks of the same type to be used selectively. Needless to say, it is possible not only to give any meanings to marks, but also to use only one mark type.

Figure 15:
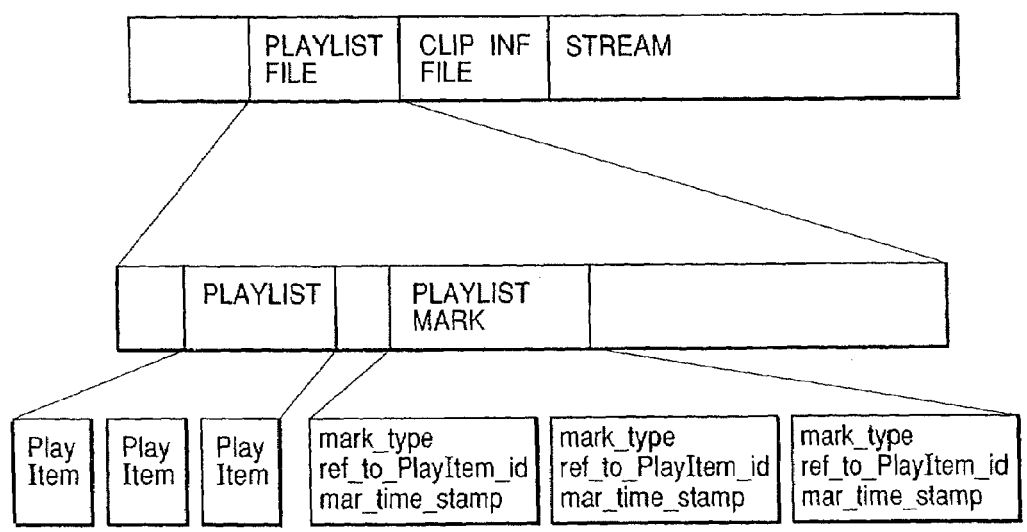
FIG. 15 is a diagram which conceptually shows the content of a play list file.

In the second embodiment, if the position of each still picture is recorded as a play list mark, it is possible to easily detect the position of the objective still picture when switching to the previous or next still picture is to be performed. For reference, FIG. 15 conceptually shows the play list management structure in the second embodiment.

Figure 9:
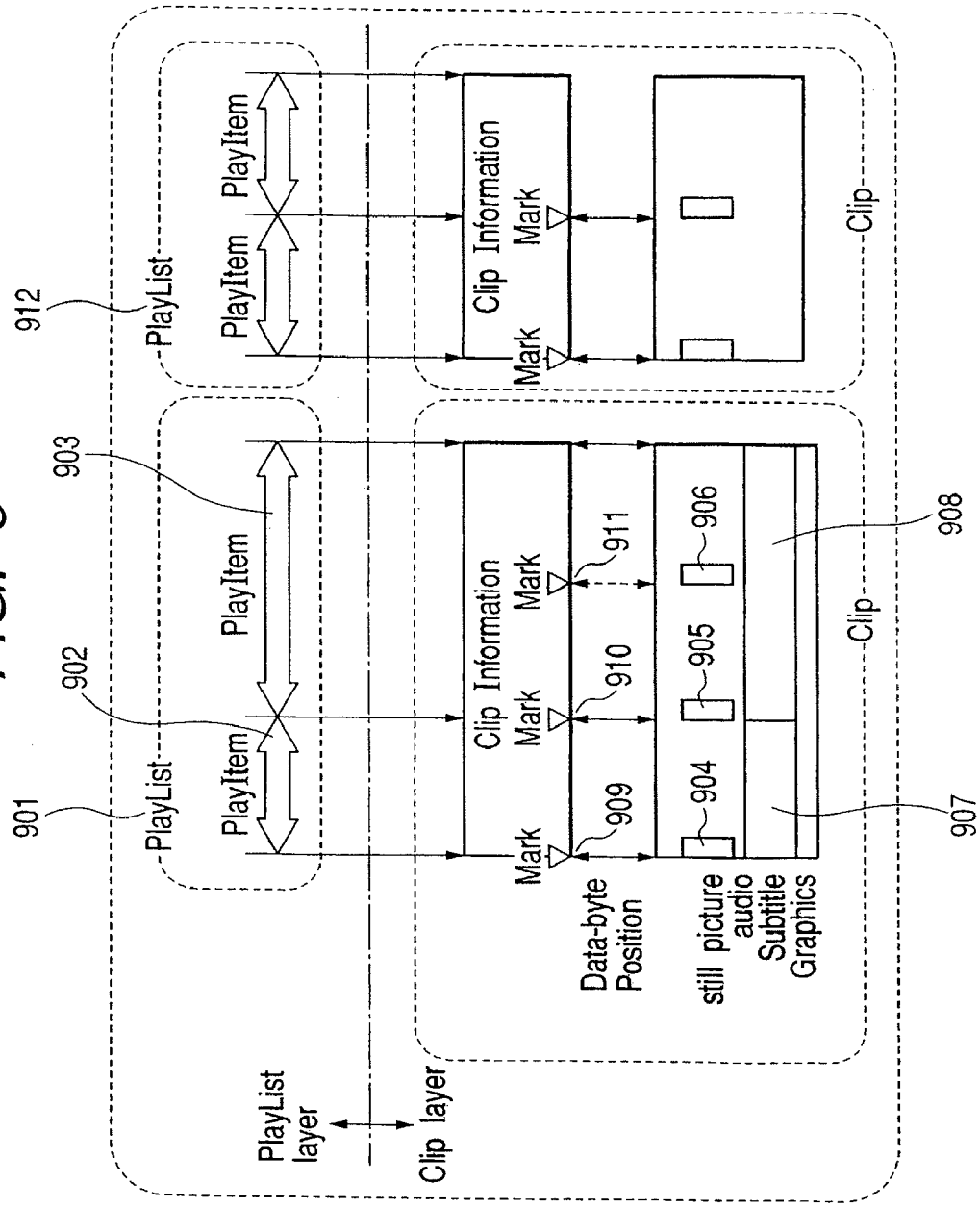
FIG. 9 is a diagram which shows how information is mutually associated when still picture information is recorded.

With reference to FIG. 9, an example of how each item of information is associated when still picture information is recorded will be described.

When still picture information is recorded, it is recorded as picture information instead of moving picture information. In the case of still picture information, picture information is not recorded continuously, but only where still picture information is to be reproduced. Meanwhile, such information as sound information and subtitle information is recorded continuously on a stream whether the information is associated with still picture information or moving picture information.

Similar to moving picture information, the still picture information to be recorded is picture information that has been compressed according to the MPEG2 format and is recorded as a file in the form of a MPEG transport packet. Unlike moving picture information, however, only one intra frame compressed picture (I picture) is recorded as still picture information. Since the information is terminated at the end of the picture information, adding a sequence end code to the picture information allows the decoder to display and hold one picture.

Figure 11:
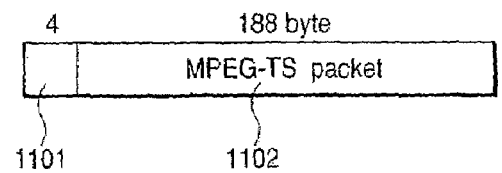
FIG. 11 is a diagram which shows the format of a MPEG-TS.

FIG. 11 conceptually shows a MPEG transport packet. The stream from the output control circuit 104 is output in the form of this MPEG transport packet.

Figure 12:
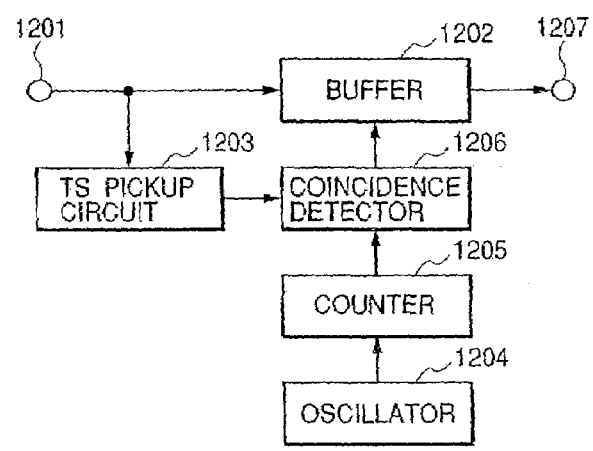
FIG. 12 is a block diagram of an output timing control circuit.
Figure 13:
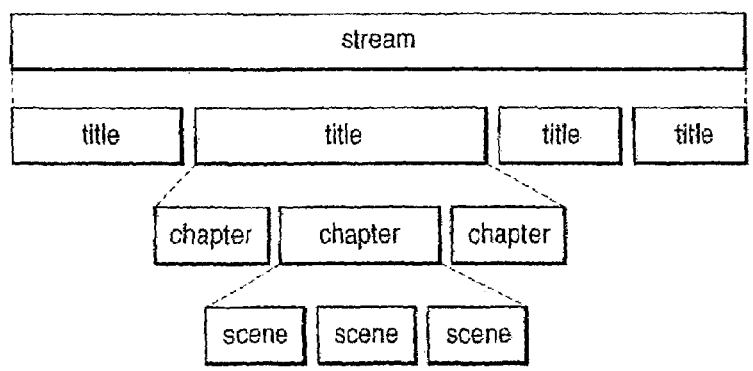
FIG. 13 is a diagram which conceptually shows an example of a stream management structure.

In FIG. 11, reference numeral 1101 designates a packet header and 1102 designates a MPEG transport packet. The MPEG transport packet is 188 bytes long. Plural consecutive packets, each with a 4-byte packet header, are recorded as a stream file. Of the packet header, 30 bits are used as a time stamp and the remaining 2 bits are used as an area to record additional information. The time stamp is used to control the output timing of the packet. Its value is determined by counting based on a 27 MHz clock. FIG. 12 shows a specific example of a portion of the output control circuit 104 that is configured to control the packet output timing. The circuit portion includes an input terminal 1201, a buffer 1202, a time stamp pickup circuit 1203, an oscillator 1204, a counter 1205, a coincidence detector 1206 and an output terminal 1207.

The signal retrieved from an optical disk is supplied to the input terminal 1201 of the output timing control circuit as a MPEG transport packet. As shown in FIG. 11, this incoming MPEG transport packet has a 4-byte packet header. The time stamp pickup circuit 1203 extracts a 30-bit time stamp from the packet header of the MPEG transport packet and supplies it to the coincidence detector 1206. Concurrently, the packet is stored in the buffer 1202.

Meanwhile, the oscillator 1204, which generates a clock signal having a frequency of 27 MHz, supplies this clock signal to the counter 1205. The counter 1205 is 30 bits long, the same as the time stamp, and it counts the 27 MHz clock pulses. The result of the counting by the counter is supplied into the coincidence detector 1206.

An example of how reproduction is performed in a reproducing apparatus according to the second embodiment will now be described with reference to FIG. 1.

On an optical disk 101, picture information streams, play list information, clip information, etc. are recorded in the aforementioned formats. Initially, the user sets the optical disk 101 into the reproducing apparatus. Once the optical disk is inserted, the drive control circuit 106 detects the presence of the inserted disk and, by sending a signal, notifies the system control circuit 111 that a disk has been inserted. Upon receiving the disk insertion signal, the system control circuit 111 reads out file management information from the optical disk 101. More specifically, the system control circuit 111 instructs the drive control circuit 106 to read out information from a prescribed sector of the optical disk 101. According to the instruction received from the system control circuit 111, the drive control circuit 106 controls the servo circuit 105 to control the rotating speed and phase of the optical disk and the position of the optical pickup 102. Accordingly, the optical pickup 102 seeks out the specified sector and reads out information therefrom by laser light.

The laser light received by the optical pickup 102 is converted to an electrical signal by a photoreceptive circuit, and the electrical signal is sent to the reproducing signal processing circuit 103. The reproducing signal processing circuit 103 converts the electric signal to digital information by performing decoding, error correction and the like on the signal. The information read out in this manner from the prescribed sector is sent back to the system control circuit 111 via the drive control circuit 106. Based on the information received from the drive control circuit 106, the system control circuit 111 analyzes the file management information and the contents of the read out files. The recorded file management information includes the directory, identifier, size and location of each file recorded on the optical disk 101. Using the file management information, the system control circuit 111 reads out the necessary files.

Then, the user instructs the reproducing apparatus to start playing the optical disk 101. More specifically, the user pushes the play start button on a remote controller (not shown). The signal transmitted from the remote controller is received by the remote control receiver 112 and supplied to the system control circuit 111. Recognizing the signal as the play start command from the user, the system control circuit 111 reads out a file info.dvr 201 to acquire the number, filenames, etc., of play list files recorded on the disk. The system control circuit 111 displays the acquired play list information on the picture information screen, urging the user to select a play list. The embodiment may also be configured in such a manner that menu picture information is displayed with thumbnails.

The user selects a desired play list from the play lists displayed on the TV picture information screen. This selection is effected by pushing a button, such as the upward, downward, rightward or leftward buttons on the remote controller. Via the remote control receiver, the system control circuit is notified as to which button has been pressed. Of course, this play list selecting operation is not necessary if the user intends to play the top play list.

Once a play list is selected, the system control circuit 111 reads out the selected play list information from the optical disk. Each play list includes a type_of_presentation entry, representing information indicating how play is to be performed. It also includes play item information indicating what parts of what stream files are to be played by designating the corresponding filenames and play start and end times. In addition, play list mark information is also written. The play list mark information includes the numbers given respectively to the play item and thumbnail associated with each marked time.

As example of how the reproducing apparatus operates when the type_of_presentation entry is 0, that is, when ordinary play is to be performed, will be described.

If the type_of_presentation entry is 0, files specified as play items will be played sequentially. More specifically, the system control circuit 111 reads out the top play item information and reads out a clip information file 207 associated with the Clip_information_file entry written there. Then, by using the clip information, the times designated in the IN_time and OUT_time entries that are written for the play item are converted to the corresponding packet start number and end number. Then, a stream file associated with the Clip_information_file entry is read out so as to replay it from the packet associated with the packet start number. Retrieved stream packets are output from the output control circuit 104 to the audio decoder 107 and video decoder 109 at the prescribed timings according to the time stamps written on the packets.

In the audio decoder 107, sound information is decoded and output to the sound information output terminal 108. Similarly, in the video decoder 109, picture information is decoded and output to the picture information output terminal 110. In addition, subtitle information, graphic information and the like are decoded in prescribed decoders (not shown) and superimposed on the picture information signal to be output. Commands multiplexed into the stream are supplied from the output control circuit 104 to the system control circuit 111 where the commands are interpreted.

The stream file is replayed until the packet which is given an end packet number associated with the OUT_time entry for the play item 902 is reached. After the end packet is replayed, the next play item 903 begins to be replayed similarly. Once the play items listed in the play list 901 all have been played, the reproducing apparatus goes back to the play list selection stage. Needless to say, the system control circuit 111 may also be modified in such a manner that, in this case, the next play list begins to be played continuously.

An example of how the skip operation is treated while picture information is being reproduced will be described.

As described earlier, play list mark information is included in the play list 901. Each play list mark is associated with a play item and indicates the time when the mark was recorded. While the play item 901 is being replayed, if the next chapter button on the remote controller is pushed by the user to replay the next chapter, the play list mark information associated with the current play item is read and a chapter mark 910 which exists later than the current replay time is retrieved as a skip mark.

In the description of the second embodiment, it is assumed that each play item corresponds to a chapter and that the top still picture mark of each chapter serves also as a chapter mark, although this should not be construed to limit the scope of the present invention. The present invention may also be implemented in such a manner that an arbitrary picture group is associated with a play item and still picture marks are set separately from chapter marks. In addition, if another skip mark is not found in the play list mark information associated with the current play item, the play list mark information associated with the next play item may be searched.

The time of the chapter mark 910 that is retrieved in this manner is acquired from its mark_time_stamp entry and the corresponding play start packet number is determined from the clip information. Then still picture information 905 begins to be reproduced from that packet. This allows the next chapter to be played in response to actuation of the next chapter button.

Similarly, if the previous chapter button is pushed to restart replay from the next previous chapter, the play list mark information associated with the currently replayed item is read to find a skip mark which is older than the current replay time. If there is no older skip mark in that play list mark information, the play list mark information associated with the next previous play item may be searched. The time of the skip mark retrieved in this manner is acquired from its mark_time_stamp entry, and the corresponding play start packet number is determined from the clip information. Then the stream file begins to be replayed from that packet. This allows the next previous chapter to be replayed in response to actuation of the chapter button. In this way, a stream can be replayed from before and after a play list mark position.

An example of picture information switching operations (skip, etc.) will be described.

In FIG. 9, the play list 901 includes two play items 902 and 903. If the play list 901 begins to be replayed, still picture information 904 and its accompanying information 907, such as sound information, included in the play item 902, are replayed at first. The still picture information 904 is immediately displayed if the stream begins to be replayed. Meanwhile, the accompanying information 907 is a stream having a predetermined length, and it is displayed over a predetermined period of time (for example, 5 seconds). This replay period was determined when the information was prepared. After the play item 902 is replayed, the play item 903 is replayed. The play item 903 includes two still pictures 905 and 906, along with accompanying sound and other information 908. If the play item 903 begins to be replayed, the still picture information 905 is immediately displayed, and, after expiration of a predetermined period of time, the still picture information 906 is displayed. During this time, the accompanying information 908 continues to be output. When the accompanying information 908 reaches to its end time, replaying the play item 904 is completed.

If the next picture button is pushed to display the next still picture information while the still picture information 905 is being replayed, the system control circuit retrieves the next picture mark 911 from the play list mark information and begins to replay the stream from the position given by the mark 911, that is, the still picture information 906. The accompanying sound and other information 908 is multiplexed with the still picture information stream. If the displayed still picture information changes, the accompanying information being output also changes. Accordingly, replay of the accompanying information 908 is restarted from the position associated with the still picture information 906, that is, the still picture mark 911 so that the remaining part of the accompanying information 908 is replayed.

Similarly, if the previous picture button is pushed to display the previous still picture information while the still picture information 905 is being replayed, the system control circuit picks up the next previous picture mark 909 from the play list mark information and begins to replay the stream from the position given by the mark 909, that is, the still picture information 904 and accompanying information 907.

As described so far, the user can easily switch the displayed picture information. In addition, the still_flag and still_duration entries can be set to play items. They are used to freeze picture information for a certain period of time at the end of a play item that is being replayed. For example, the play item 902 will be frozen for 10 seconds at its end if the still_flag entry is set and the value 10 is assigned to the still_duration entry. The system control circuit recognizes that the still_flag entry is set for the play item 902 after the play item 902 is replayed, and freezes the display. More specifically, the system control circuit stops the output of the sound information and continues to display the last picture information. Then, the system control circuit starts replaying the next play item after 10 seconds have passed. Thus, the display can be frozen for an arbitrary period after play item replay. If the next picture button is pushed while the display is frozen, replay may be restarted from the position of the next still picture flag. If the still_duration entry is set to 0, replay is controlled so as to freeze the display until some operation is performed by the user. This processing, combined with command processing, can be applied to, for example, menu selection by the user.

As shown in FIG. 6, since the still_flag entry is set on an each play list basis in the play list information structure of this embodiment, only the last picture information of each play item can be frozen. To allow picture information during a play item replay to be frozen, the play item must be divided into separate play items or the syntax must be modified so that the still_flag and still_duration entry information can be set more than once for each play item.

Note that, although the stream associated with the play list 912 in the example of FIG. 6 has only still picture information and does not contain sound and other accompanying information, the play list 912 also allows the same replay and skip operations as the play list 901. In addition, if every I picture of moving picture information is associated with a mark in the same manner as still picture information, switching to another I picture can be performed easily when moving picture information is displayed as still picture information.

As described so far, plural still pictures recorded in the second embodiment can be easily switched to either display the next picture or a previous picture. Also, when moving picture information is displayed as still picture information, switching to either the next or the previous picture can be performed easily.

Figure 10:
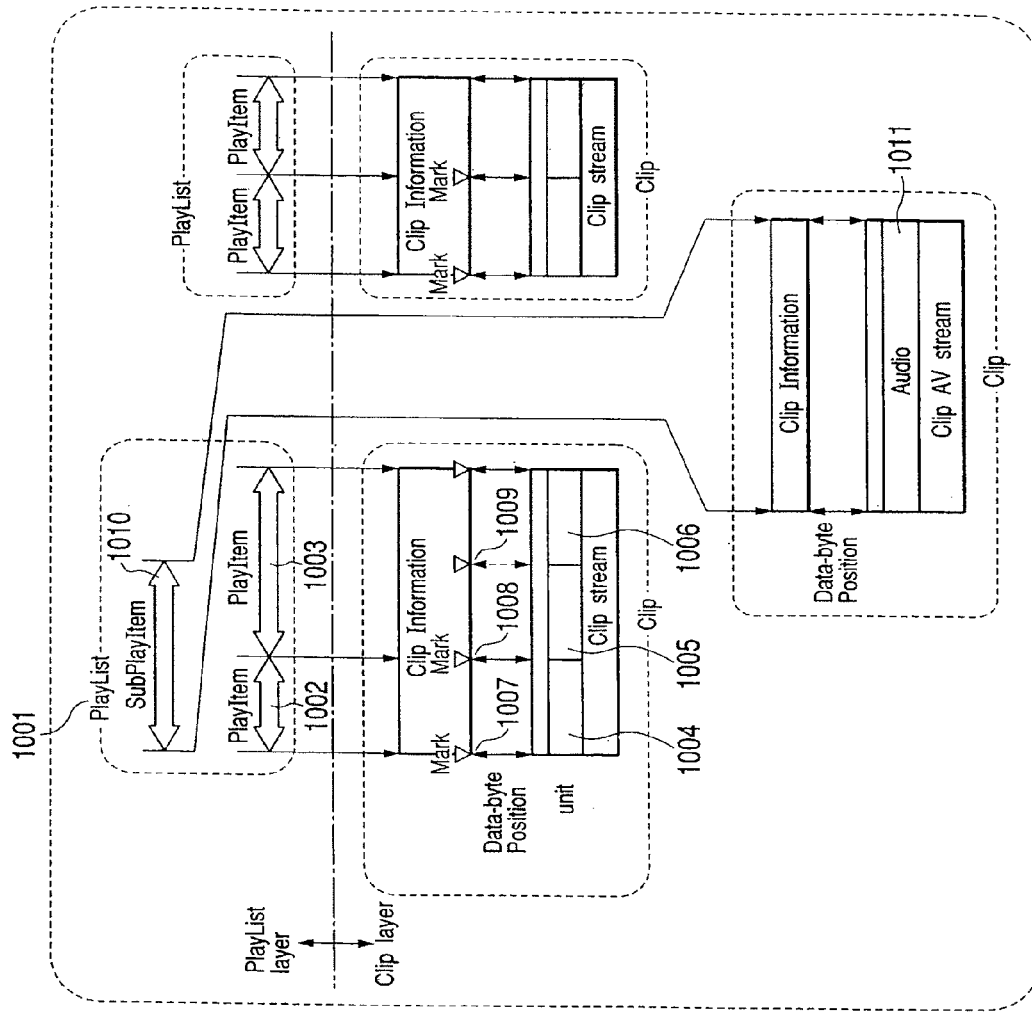
FIG. 10 is a diagram which shows how information is mutually associated when BGM-combined still picture information is recorded.

A third embodiment of the present invention will be described with reference to FIG. 10. In the second embodiment described above, if the displayed still picture information is switched due to a skip operation or the like, the accompanying sound information is switched as well. However, it is preferable to continuously output sound information without a break, for example, while a menu is being displayed for selection or while still picture information is being displayed like a photo album. Accordingly, as shown in FIG. 10, BGM sound information is recorded as a sub play item separately from the ordinary play items. FIG. 10 shows how information is mutually associated when BGM-combined still picture information is replayed.

If still picture information has been multiplexed with sound and other information before being recorded, as shown in FIG. 9, switching the displayed picture information to another picture as instructed by the user results in switching not only the picture information, but also the associated sound and other accompanying information. This is not always desirable, for example, when a menu screen is to be displayed using still picture information. Accordingly, the third embodiment is configured in such a manner that even when picture information is switched, sound information can be replayed continuously without a break.

More specifically, as shown in FIG. 10, a play list includes not only a plurality of still pictures specified as ordinary play items, but also sound information specified as a sub play item. Since this allows the sound information to be replayed independently of the still picture information, the sound information can be replayed continuously even when the displayed still picture is switched.

In view of the information syntax, a play item can be defined as BGM-combined still picture information by specifying type_of_presentation=1 in the play list information.

An example of how BGM-included information, as shown in FIG. 10, is replayed will be described.

To replay still picture information with BGM, the entry type_of_presentation is set to 1. In a play list 1001, a sub play item 1010 is included with two play items 1002 and 1003. More specifically, the audio stream 1011 is specified as SubPlayItem( ) according to the information syntax in FIG. 6. Here, the stream corresponding to the play items includes subtitle information, graphic information and control commands, as well as picture information, but does not contain sound information. Meanwhile, the sub play item stream 1011 contains only sound information.

When the play list 1001 is to be replayed, information about the play items (1002 and 1003) and the sub play item 1010 is acquired from the play list (FIG. 4). Then, a clip information file is read out according to the Clip_information_file_name entry in the play item (FIG. 6). Using this clip file information, the stream replay start packet number associated with the time specified in the IN_time entry is obtained. Further, the stream file associated with the clip information file is read in to output and decode picture information starting from the packet having the replay start packet number. The streams 1004, 1005 and 1006 replayed here as play items include picture information and subtitle information, but they do not contain sound information. Or, even if sound information is included, control is carried out so as to abort the sound information without outputting it. The play items in the play list 1001 are replayed through this processing procedure.

Meanwhile, the sub play item 1010 is also specified in the play list 1001. If the type_of_presentation entry is specified as 1 in the play list information, the system control circuit in the reproducing apparatus judges that this play list includes the replay of still picture information with BGM. In this case, the sub play item is to be treated as BGM sound information. More specifically, a stream 1011 corresponding to the sub play item 1010 is read in and control is performed so as to repeatedly replay this stream. Of course, this control may be modified so as to replay the sub play item stream only once. It is also possible to allow the number of times replay is repeated to be specified/recorded for the sub play item. Note that the sub play item must be replayed concurrently with a play item. For example, time division processing makes it possible to read in and replay/output both stream files concurrently. Of course, the same result can be obtained by reading the whole sub play item into a prepared large capacity buffer memory in advance.

Then, on the assumption that the recorded information is structured as shown in FIG. 10, an example of how the replayed still picture information is switched when instructed by the user will be described.

As described earlier, if the play list 1001 is selected, the play items 1002 and 1003 will be replayed sequentially to output still picture information. Concurrently, the sub play item 1010 will also be replayed to output sound information from the stream 1011.

If the next picture button is pushed by the user to display the next still picture while the stream 1005 is being replayed, the system control circuit retrieves the next still picture mark 1009 from the play item marks and restarts replay at that position. Thus, the replayed still picture information is switched to display the still picture information contained in stream 1006. Meanwhile, the sub play item 1010 continues to be replayed independent of the user's still picture switching operation. Thus, the stream 1011 can be replayed to continuously output sound information without a break even when the replayed picture information is switched as instructed by the user.

The information structure shown in FIG. 10 also allows the still_picture_flag and still_duration entry to be used to freeze the display of each picture information for an arbitrary period after being replayed. Also, in this case, it is possible to prevent sound information from breaking if control is carried out so as to continuously output the sub play item 1010, i.e., the BGM sound information.

In the third embodiment, as described so far, by using a sub play item as BGM sound information, it is possible to continuously output sound information even when the replayed image information is switched by the user.

Note that, although in the specific example mentioned above, two types of play list marks (chapter marks and still picture marks) are selectively used, this should not be construed to limit the implementation of the present invention. It is also possible to use play list marks of the same type. In this case, it is possible to perform appropriate processing based on the result of judging whether the picture information being replayed is ordinary moving picture information or still picture information.

As described, in accordance with the third embodiment, a plurality of recorded still pictures can be easily switched to display either the next picture or a previous picture. In addition, it is possible to continuously output sound information as BGM while still picture information is displayed.

More particularly, the present invention makes it possible to easily switch reproduced still picture information and provides a user-friendly reproducing technique.

Although the present invention has been described in terms of particular embodiments, other embodiments can also be implemented without departing from the spirit and scope of the present invention. The particular embodiments as described herein are merely examples and are not to be construed as limiting, in any way, the scope of the present invention. The scope of the present invention should be assessed in accordance with the appended claims. Further, the scope of the present invention encompasses all changes and modifications which are equivalent to the subject matter of the appended claims.

What is claimed is:

1. An information reproducing method for reproducing information from a recording medium, the information comprising;
    a stream file including still pictures or sound; and
    a PlayList file including a PlayList for ordering still pictures and sound to be played,
        wherein the PlayList has type information of presentation which indicates that the sound is continuously reproduced even when the reproduced still picture is switched, and the PlayList has one or more PlayItems and SubPlayItems, each of the PlayItems has a start information indicating a presentation start time and an end information indicating a presentation end time of one or more still pictures, and each of the SubPlayItems has a start information indicating a presentation start time and an end information indicating a presentation end time of the sound,
    said information reproducing method comprising the steps of:
        controlling presentation time of said still picture in accordance with said start information and end information; and
        independently reproducing still pictures indicated by the PlayItems and sound indicated by the SubPlayItems, and controlling presentation without interrupting each other based on said type information of presentation.

2. An information recording method for recording information on a recording medium, the method comprising the steps of;
    recording a stream file including still pictures or sound; and
    recording a PlayList file including a PlayList for ordering still pictures and sound to be played,
    wherein the PlayList has type information of presentation which indicates that the sound is continuously reproduced even when the reproduced still picture is switched, and the PlayList has one or more PlayItems and SubPlayItems, each of the PlayItems has a start information indicating a presentation start time and an end information indicating a presentation end time of one or more still pictures, and each of the SubPlayItems has a start information indicating a presentation start time and an end information indicating a presentation end time of the sound, and wherein the still pictures indicated by the PlayItems and the sound indicated by the SubPlayItem are independently reproduced based on said type information of presentation.

* * * * *